May 28, 1957 G. HARRISON 2,793,852
METAL CHIP MELTING APPARATUS
Filed March 19, 1951
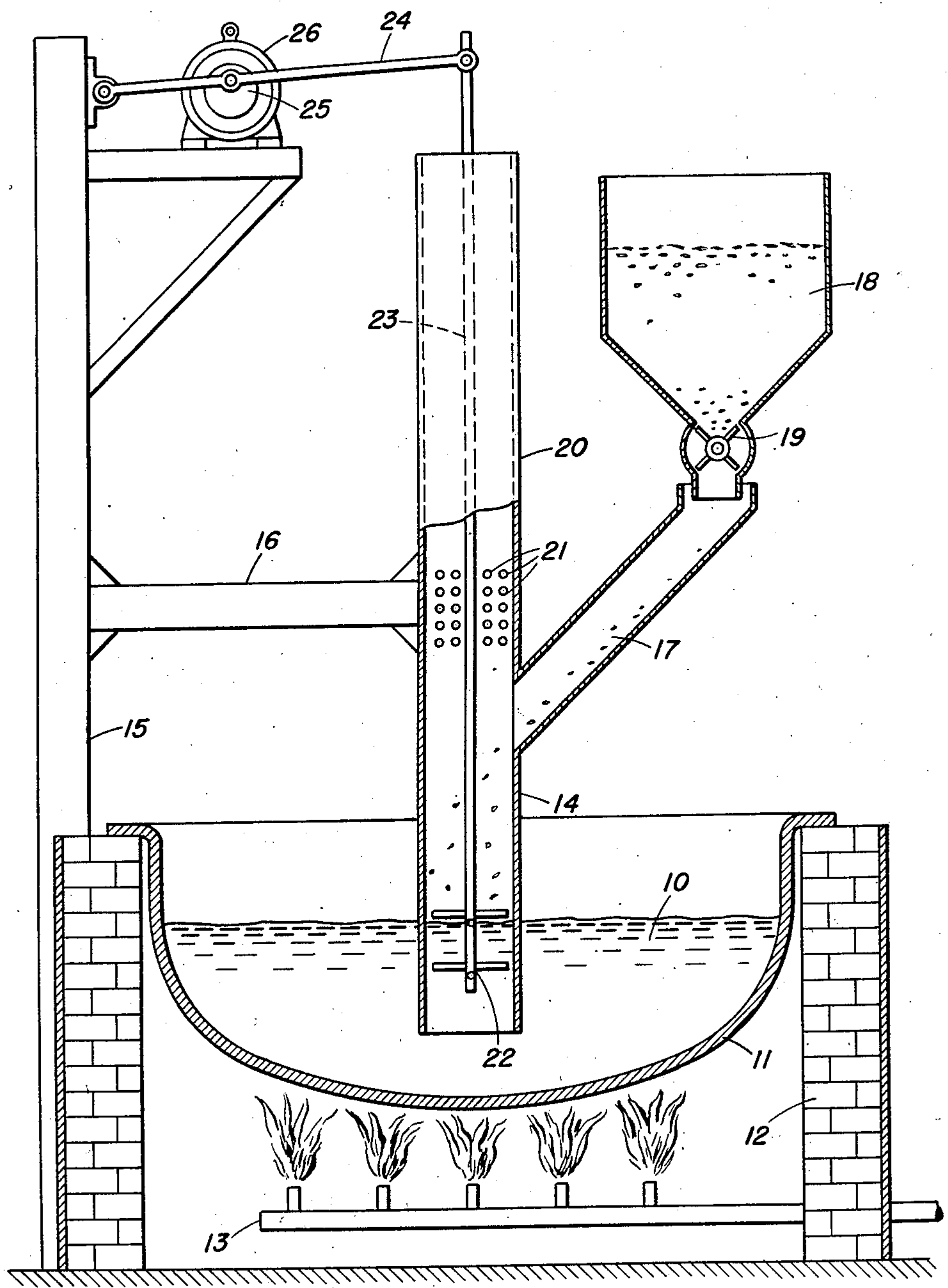
INVENTOR
George Harrison
BY
Charles F. Kaegebehn
ATTORNEY United States Patent Office 2,793,852

Patented May 28, 1957

2,793,852

METAL CHIP MELTING APPARATUS

George Harrison, Berwyn, Ill., assignor to National Lead Company, New York, N. Y., a corporation of New Jersey Application March 19, 1951, Serial No. 216,407

2 Claims. (Cl. 266—33)

This invention relates to apparatus for melting metallic chips, particularly oily chips of a metal such as aluminum which oxidizes relatively readily and has heretofore been difficult to melt efficiently in finely-divided form.

The remelting of finely divided oxidizable metals such as aluminum and magnesium has posed a serious problem in the industry. These metal chips as herein referred to comprise borings, turnings and other types of relatively finely-divided particles which are often coated with oil employed in the machining or working processes. Recovery of such metal chips has heretofore been accompanied by inefficient melting, formation of successive amounts of dross, and high melting loss. For example, aluminum borings and turnings containing about 3% oil, when remelted directly according to heretofore known methods, have produced only about 75% recovery of their metal content, showing a 25% melting loss. Methods of melting such material wherein the oil is first burnt off the chips results in lower melting loss, in the neighborhood of 6%, however, the additional cost and processing involved in burning off the oil counteracts the advantage of lower melting loss.

It is the object of this invention, therefore, to provide apparatus for melting oily metallic chips of the class described efficiently and with extremely low melting loss. Another object of this invention is to provide apparatus for melting oily metal chips in which a substantially oxygen-free chamber is arranged in which the chips are melted. These and other objects of the invention will become apparent from the following more detailed description thereof.

The invention in its broadest aspects contemplates apparatus for melting metallic chips which comprise a melting tube with its lower extremity submerged in a bath of molten metal and having means for feeding chips to be melted in the side thereof. An upward extension of the melting tube is formed into a flue in which means for admitting air for complete or substantially complete combustion of the oil content of the chips are provided. The molten metal bath is constituted of the same metal as the chips being melted. The details of the construction of the apparatus of this invention will be apparent from the drawings in which:

Fig. 1 shows a general view of the apparatus partly broken out.

Referring to Fig. 1, and showing, for example, apparatus employed in the melting of aluminum chips, a molten aluminum bath 10 is contained in a suitable container such as pot 11 which is, in turn, supported in furnace 12 and heated by gas burners 13. Melting tube 14 is suitably supported from post 15 by bracket 16 in such position that its lower extremity is submerged below the level of the metal bath 10. Side arm 17 projects from the upper portion of melting tube 14 and is provided at its open end with means for feeding chips thereinto as shown for example, hopper 18, having feed control 19 at or near its outlet. The upper portion of melting tube

14 is extended to form flue 20 which is provided at or near its lower end with means for admitting air, for instance, perforations 21.

The chips fed through side arm 17 into melting tube 14 are preferably forcibly submerged below the level of metal bath 10 by the action of suitable ramming means, shown in the embodiment illustrated, as tined ram 22 connected by ramrod 23 to lever 24 which is pivoted to post 15. Reciprocating action is imparted to lever 24 and in turn to ram 22 by the action of cam 25 which is rotated by motor 26.

In operation, the hopper 18 is loaded with metal chips for instance aluminum borings or turnings which contain about 3% oil. These are fed through a side arm 17 and into the melting tube 14 at a rate commensurate with the ability of the heating means associated with the metal bath to melt them. Due to the high temperature imparted by the molten metal at the bottom of the tube 14, the oil content of the chips becomes vaporized and ignited. The oil vapors and smoke pass upwardly in the tube 14 and into the flue where combustion is completed by secondary air admitted through the perforations 21. Considerable draft up the flue is thus created and the portion of the melting tube in which the chips are heated or melted is thereby maintained substantially free of oxygen. Under these conditions, the finely-divided chips are heated and melted without appreciable loss by oxidation. During the operation, the ram 22 is vertically reciprocated forcing the chips which are already hot and partially molten beneath the surface of the metal bath 10 to complete the melting operation. The melting may be operated continuously by feeding chips to the apparatus and withdrawing metal from the molten bath. The molten metal level must, however, be maintained high enough to submerge the lower end of the melting tube.

Metal chips suitable for melting according to this invention should contain at least 1.5% oil and preferably 2% or more. The presence of the oil is necessary since this is vaporized by the hot metal at the bottom of the melting tube and rising in the tube is burned with air admitted in the sides of the tube. The combustion creates a strong draft up the flue which draws up any air entering with the feed material and maintains the chamber at the lower end of the melting tube substantially oxygen free.

The means employed for pushing the chips beneath the metal surface, for instance, ram 22, may be made of suitable metal such as iron or steel and does not corrode rapidly because its period of exposure above the molten metal result in a protective surface coating of carbon or soot.

Operation of the apparatus of this invention as shown with oily aluminum turnings and borings, heretofore melted at best with a melting loss of about 6%, can be accomplished consistently for extended periods showing a melting loss of less than 1%.

While this invention has been described and illustrated by the examples shown, it is not intended to be strictly limited thereto and other modifications and variations may be employed within the scope of the following claims.

I claim:

1. Apparatus for melting oily metal chips comprising in combination a melting pot adapted to contain a bath of molten metal, a melting tube vertically supported with its lower end submerged below the surface of said bath, a vertically reciprocatable ram inside said melting tube with associated means for reciprocating same, said ram being of such dimensions that its lower end is generally submerged below the surface of said bath in its lowermost position, a side arm projecting out from the upper portion of said melting tube and provided with means for feeding metal chips therethrough, and a flue section forming a generally vertical upward extension of the said melting tube and provided with means for admitting air in the lower portion of said section, said means being positioned at a point above that where said side arm projects out from said melting tube.

2. Apparatus for melting oily metal chips comprising in combination a melting pot adapted to contain a bath of molten metal, a melting tube vertically supported with its lower end submerged below the surface of said bath, a vertically reciprocatable tined ram inside said melting tube with associated means for reciprocating same, said ram being of such dimensions that its lower end is generally submerged below the surface of said bath in its lowermost position, a side arm projecting out from the upper portion of said melting tube and provided with means for feeding metal chips therethrough, and a flue section forming a generally vertical upward extension of the said melting tube and provided with means for admitting air in the lower portion of said section, said means being positioned at a point above that where said side arm projects out from said melting tube.

References Cited in the file of this patent

UNITED STATES PATENTS

| | | |
|---|---|---|
| 969,253 | Diack | Sept. 6, 1910 |
| 2,035,282 | Schmeller | Mar. 24, 1936 |
| 2,072,650 | Schmeller | Mar. 2, 1937 |
| 2,181,148 | Perkins et al. | Nov. 28, 1939 |
| 2,300,141 | Whitzel | Oct. 27, 1942 |
| 2,493,391 | Chew | Jan. 3, 1950 |